(12) United States Patent
Stark et al.

(10) Patent No.: US 6,908,089 B1
(45) Date of Patent: Jun. 21, 2005

(54) WHEELBARROW CHUTE ATTACHMENT

(76) Inventors: Timothy R. Stark, 260 Thom. B. Landers Rd., E. Falmouth, MA (US) 02536; Allan B. Williamson, 25 Corrine Dr., E. Falmouth, MA (US) 02536

( * ) Notice: Subject to any disclaimer, the term of this patent is extended or adjusted under 35 U.S.C. 154(b) by 0 days.

(21) Appl. No.: 10/328,499

(22) Filed: Dec. 26, 2002

(51) Int. Cl.$^7$ ............................................. B20B 1/20
(52) U.S. Cl. ........................ 280/47.31; 280/47.32; 280/78; 222/461; 298/7
(58) Field of Search .................. 280/653, 645, 280/652, 33.992, 33.995, 47.31, 47.3, 47.32, 280/78; 222/460, 461, 462; 298/2, 3, 7

(56) References Cited

U.S. PATENT DOCUMENTS

| | | | |
|---|---|---|---|
| 618,900 A | 2/1899 | Oakey | |
| 1,015,024 A * | 1/1912 | Hubbard | 280/47.31 |
| 1,157,034 A * | 10/1915 | Page | 280/47.31 |
| 1,158,291 A * | 10/1915 | Rickards | 280/47.31 |
| 1,544,769 A | 7/1925 | Nalder | |
| 1,769,271 A | 7/1930 | Parsons | |
| 2,233,710 A * | 3/1941 | Osterkamp | 280/47.31 |
| 2,240,585 A * | 5/1941 | Taylor | 298/3 |
| 2,247,083 A * | 6/1941 | Garlinghouse | 280/47.12 |
| 2,768,022 A | 10/1956 | Pope | |
| 2,805,885 A | 9/1957 | Elzea | |
| 3,161,434 A * | 12/1964 | Jerpbak | 296/36 |
| 3,418,005 A | 12/1968 | Allina | |
| 4,299,340 A * | 11/1981 | Hrytzak | 222/189.07 |
| D269,335 S | 6/1983 | Eubanks | |
| 4,645,225 A | 2/1987 | Eubanks | |
| D311,084 S | 10/1990 | Batchelor | |
| 5,195,662 A * | 3/1993 | Neff | 222/108 |
| 5,374,095 A | 12/1994 | Ramseth | |
| 5,505,347 A * | 4/1996 | Roma | 222/570 |
| 5,601,298 A * | 2/1997 | Watanabe | 280/47.31 |
| 5,758,804 A * | 6/1998 | Wirth | 222/460 |
| 5,806,866 A * | 9/1998 | Fleischer | 280/47.31 |
| 5,839,772 A | 11/1998 | Toole | |
| D404,534 S | 1/1999 | Dickson | |
| 5,884,924 A * | 3/1999 | Fairchild et al. | 280/47.31 |
| 5,971,410 A * | 10/1999 | Nichols | 280/47.31 |
| 6,209,595 B1 * | 4/2001 | Granath | 141/340 |
| 6,213,482 B1 | 4/2001 | Yemini | |
| 6,213,532 B1 * | 4/2001 | Dunyon | 296/32 |
| 2003/0201616 A1 * | 10/2003 | Friel | 280/47.31 |

* cited by examiner

Primary Examiner—Christopher P. Ellis
Assistant Examiner—Jeff Restifo
(74) Attorney, Agent, or Firm—John P. McGonagle

(57) ABSTRACT

A semi-enclosed pouring chute attachment for a wheelbarrow. The attachment sits on the front of the wheelbarrow and is secured by upper side channels and either rope of shock/bungee cords from the sides of the attachment to the handles of the wheelbarrow. In an alternate embodiment, the wheelbarrow container may have a funnel end as an integral part thereof.

1 Claim, 7 Drawing Sheets

WHEELBARROW CHUTE ATTACHMENT

BACKGROUND OF THE INVENTION

This invention relates to wheelbarrows, and in particular, to a semi-enclosed chute attachment for a wheelbarrow.

There is a need both in home and commercial applications for a wheeled tool which allows one to transport bulky or heavy loads. The most commonly used tool to accomplish this purpose is called a wheelbarrow. A wheelbarrow is generally comprised of a forward wheel, a frame joined to and extending back from the wheel and terminating at the back of the wheelbarrow in handles which the user lifts to roll the wheelbarrow, two support legs joined to the frame at the back of the wheelbarrow in front of the handles, and a container resting on the frame. The container, also referred to as a tray or a tub, typically is roughly rectangular in shape. The front of the wheelbarrow container may be somewhat rounded. A wheelbarrow is usually unloaded by tipping vertically over the front wheel.

Most wheelbarrows are designed to have the widest possible utility in transporting a variety of materials within the wheelbarrow. As such, the wheelbarrow is an effective and highly useful tool. However, some of the applications for which a wheelbarrow is effective require an accurate pouring of the contents being emptied from the wheelbarrow. The front shape of the normal wheelbarrow container provides a broader pouring front than is always desirable. The prior art contains various patents for devices with the purpose of expanding the capacity of a wheelbarrow tray. However, none of these devices specifically address the need to accurately channel the materials being emptied from the wheelbarrow. There is, therefore, a need for a pouring, chute-like attachment for a conventional wheelbarrow.

SUMMARY OF THE INVENTION

The present invention provides a semi-enclosed pouring chute attachment for a wheelbarrow. The primary function of the invention attachment is to serve as an accuracy enhancing channeling device for materials being emptied from the wheelbarrow. The material could be solids, semi-solids, or liquids. The attachment sits on the front of the wheelbarrow and is secured by upper side channels and either rope of shock/bungee cords from the sides of the attachment to the handles of the wheelbarrow. In an alternate embodiment, the wheelbarrow container may have a funnel end as an integral part thereof or as an insert.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be made to the accompanying drawings and descriptive matter in which there is illustrated a preferred embodiment of the invention.

DETAILED DESCRIPTION OF THE INVENTION

Figure 1:
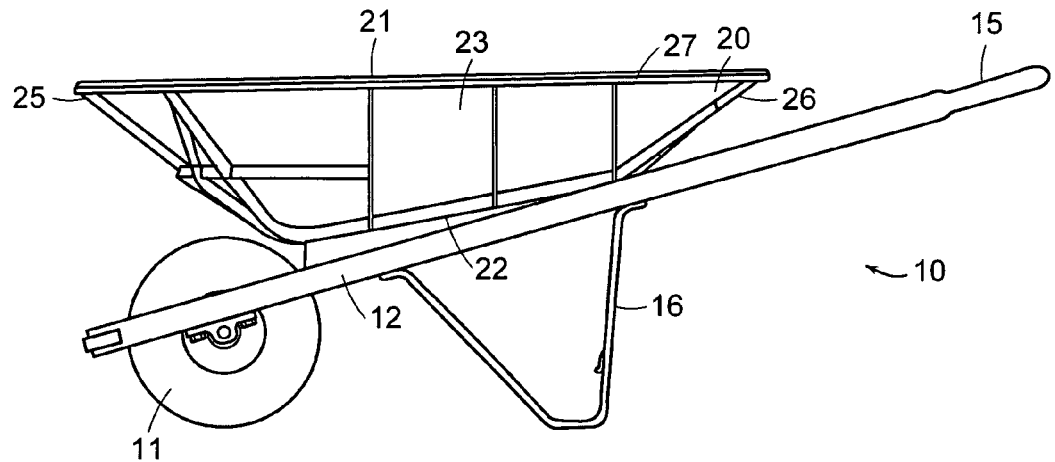
FIG. 1 is a right side elevational view of a conventional wheelbarrow.
Figure 2:
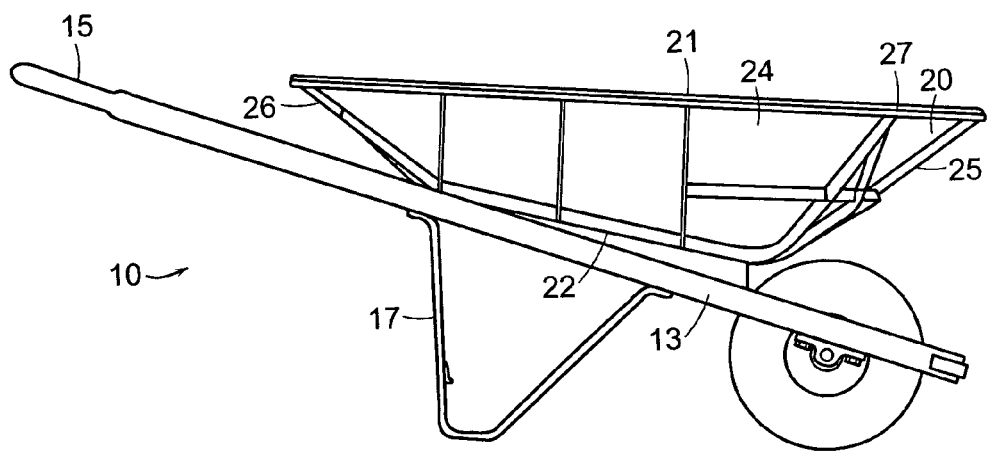
FIG. 2 is a left side elevational view of a conventional wheelbarrow.
Figure 3:
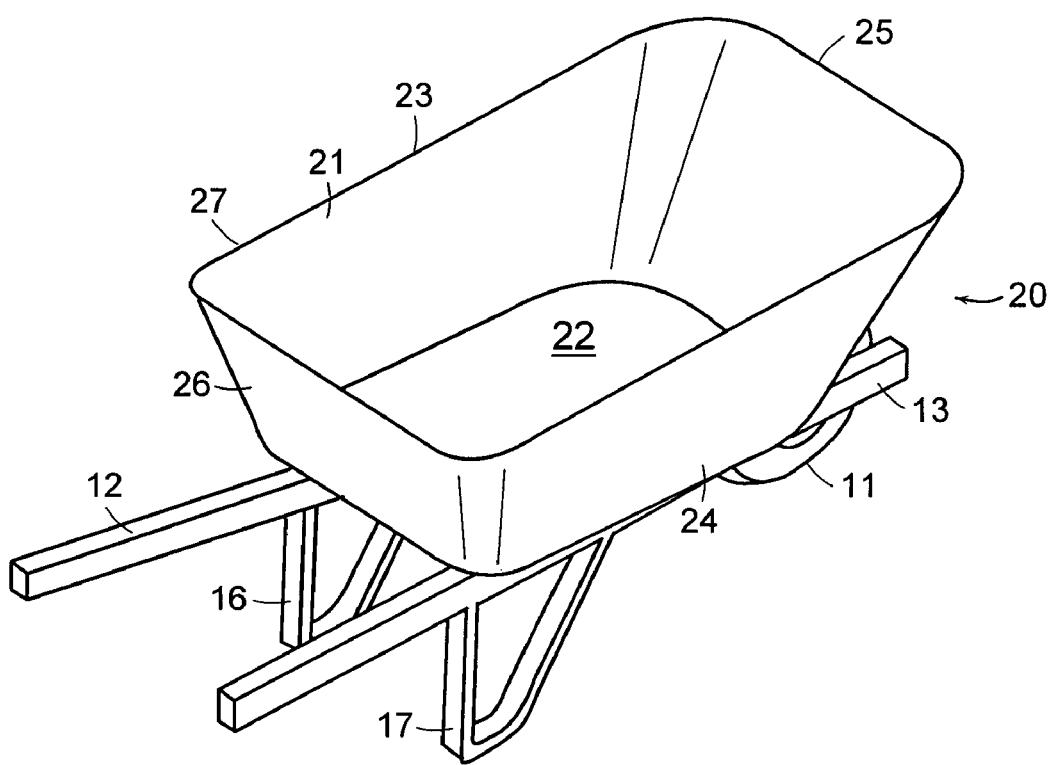
FIG. 3 is a rear perspective view of a conventional wheelbarrow.
Figure 4:
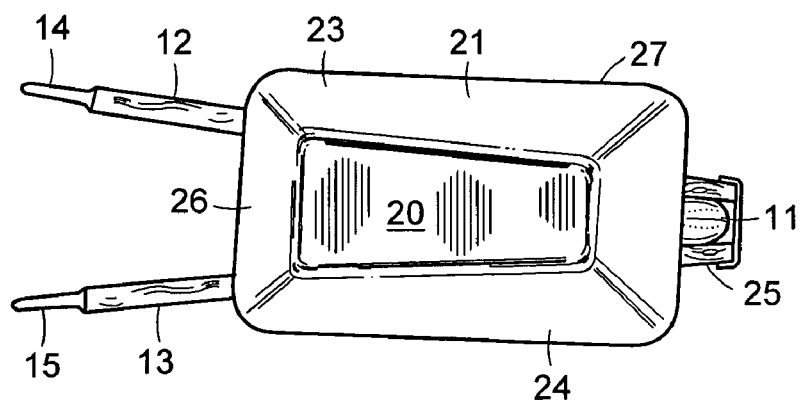
FIG. 4 is a top view of a conventional wheelbarrow.
Figure 5:
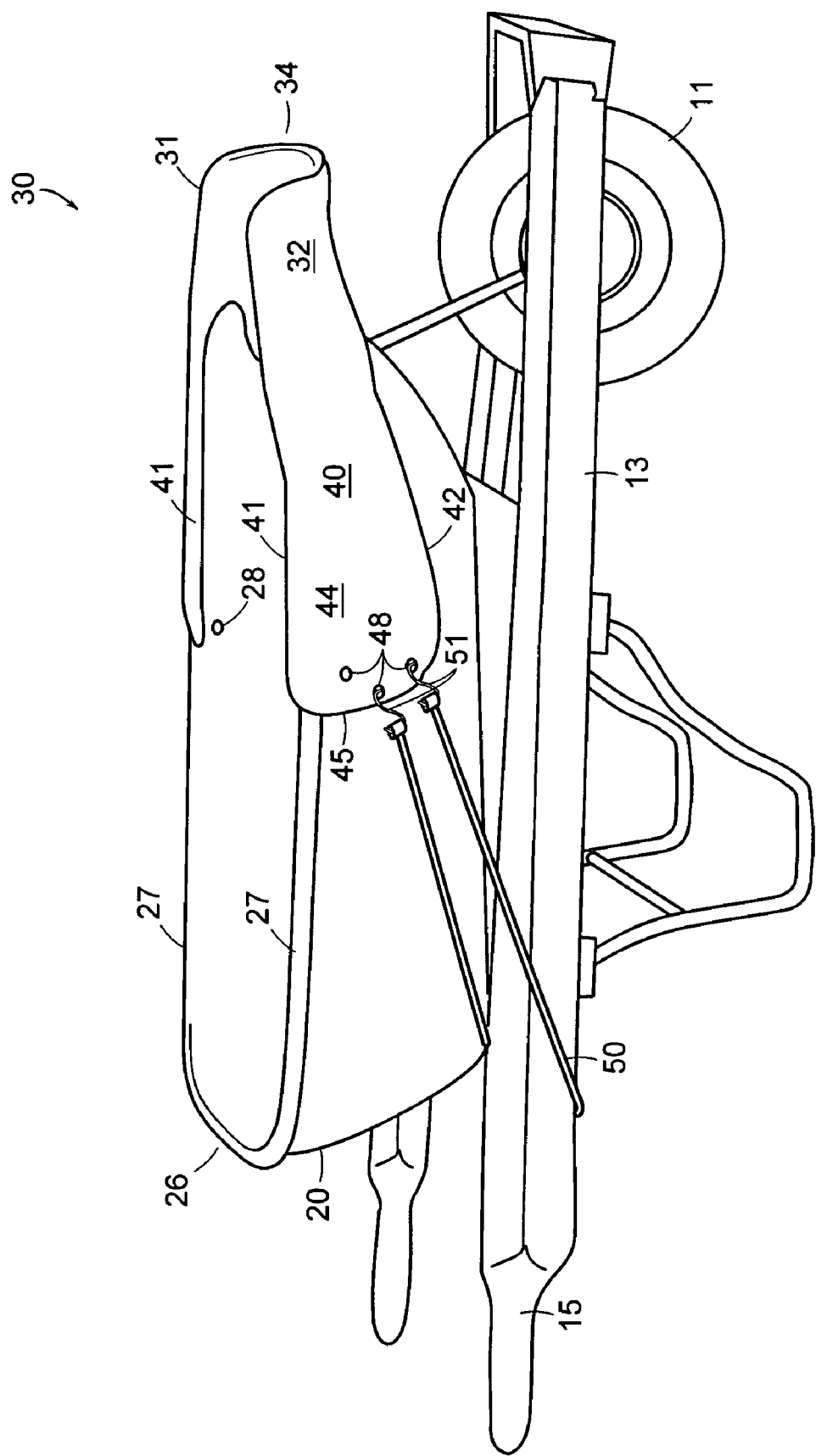
FIG. 5 is a side perspective view of a wheelbarrow with a chute attachment.
Figure 6:
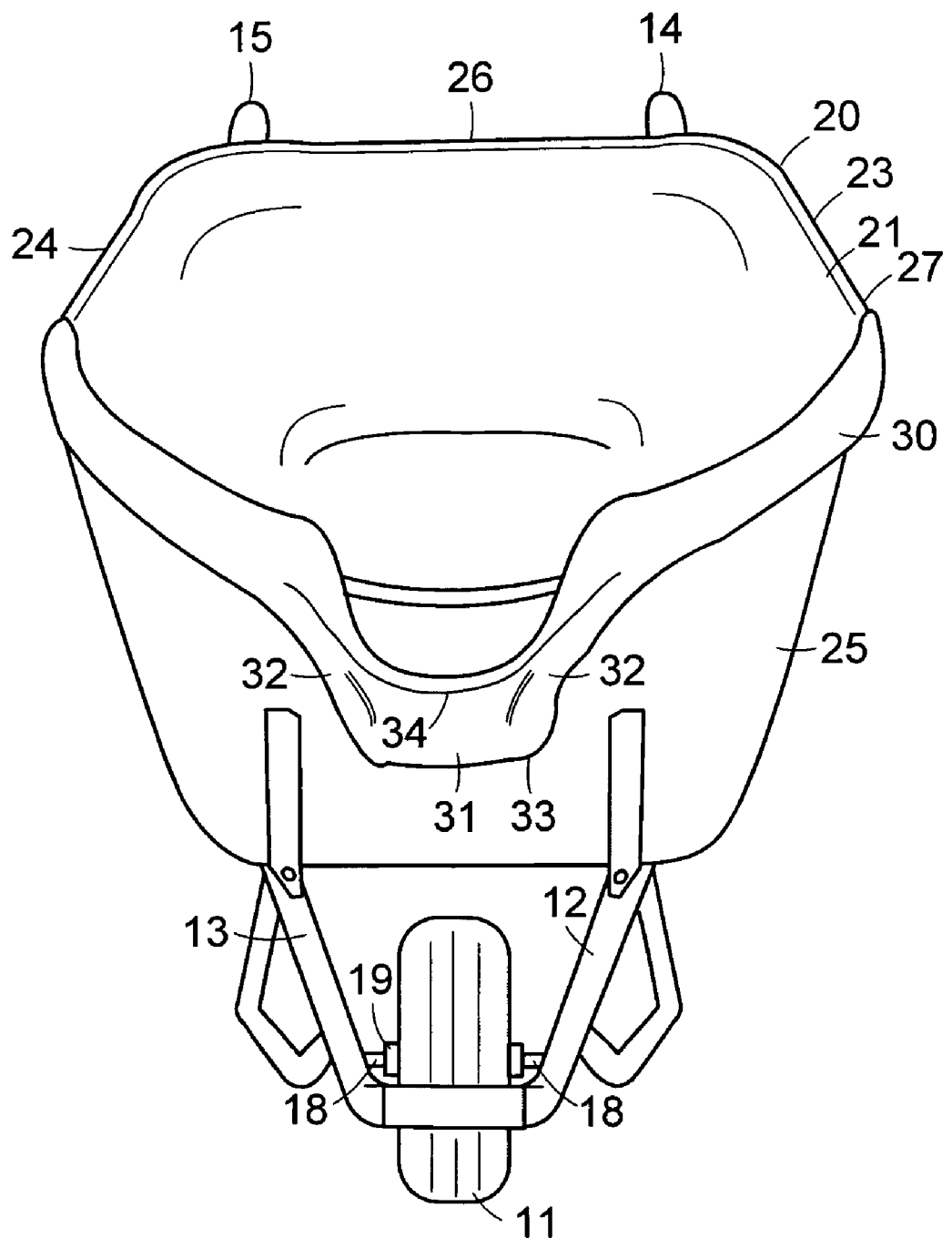
FIG. 6 is a front view a wheelbarrow with a chute attachment.
Figure 7:
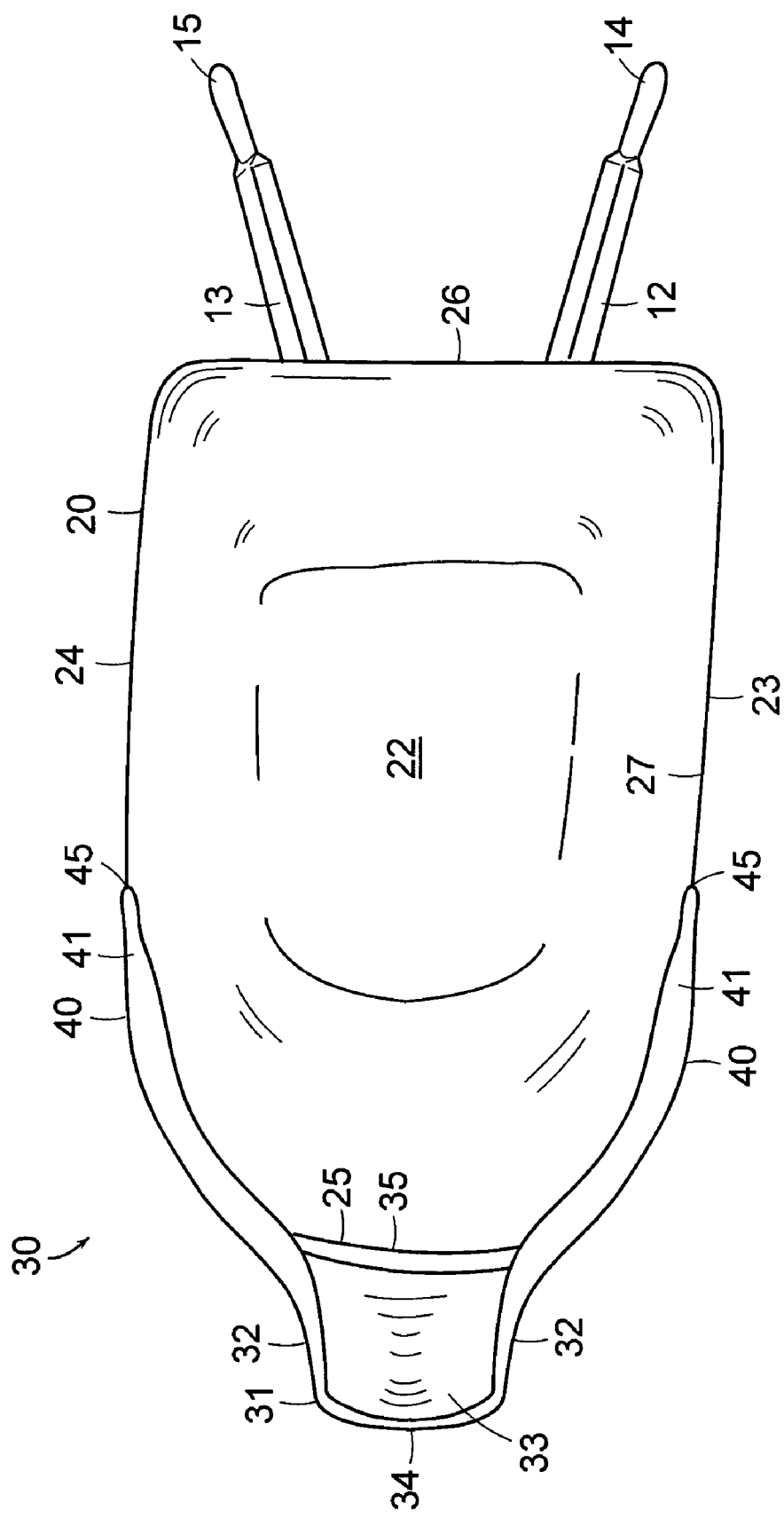
FIG. 7 is a top view a wheelbarrow with a chute attachment.
Figure 8:
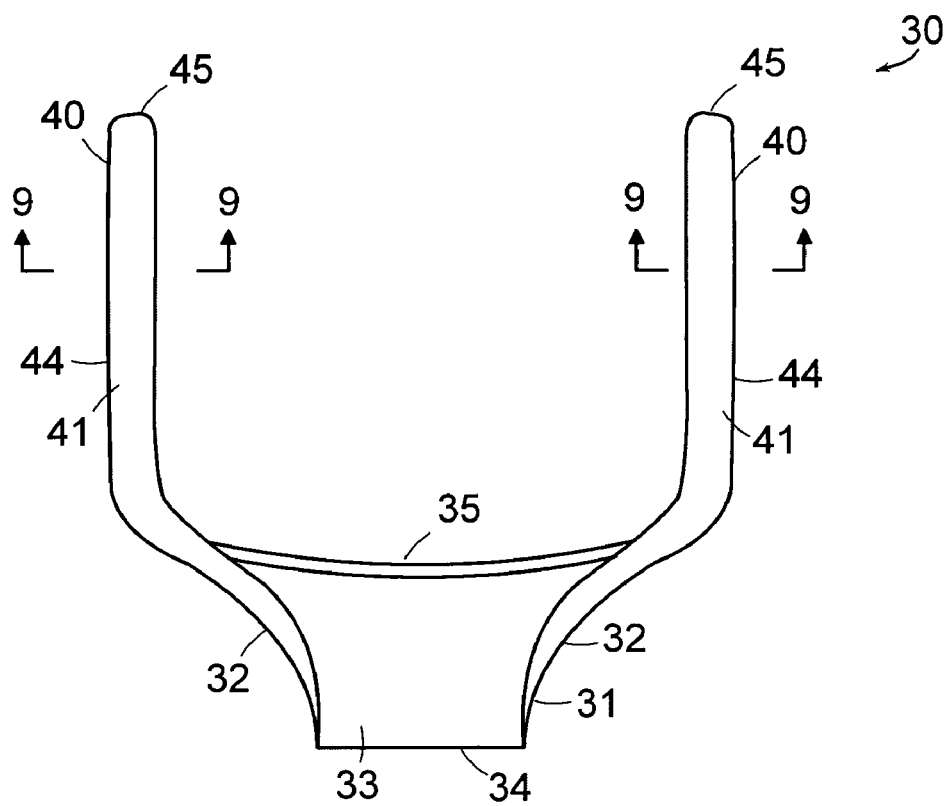
FIG. 8 is a top view of the chute attachment.
Figure 9:
FIG. 9 is a section view along the lines 9—9 of FIG. 8.

Referring to the drawings in detail wherein like elements are indicated by like numerals, especially FIGS. 1–4, reference numeral 10 generally represents a wheelbarrow having a front with a single forward wheel 11, two side frame pieces 12, 13 running in a rearwardly diverging manner from the front wheel 11, from which two handles 14, 15 are respectively extended and form a wheelbarrow rear, two rearward support legs 16, 17 each joined to a side frame piece 12, 13, respectively, at the back of the wheelbarrow in front of the handles 14, 15, and a container body 20 resting on the two side frame pieces 12, 13 behind the forward wheel 11 and in front of the handles 14, 15, said container body 20 having an open top 21, generally planar bottom 22 attached to said side frame pieces 12, 13, upwardly and outwardly inclined opposing sides 23, 24, an upwardly and outwardly inclined front end 25 and opposing rear end 26. The container body front end 25, rear end 26 and sides 23, 24 have a continuous rim 27 formed along the top 21. On the forward end of the side frame pieces 12, 13 are respectively two bearings 18 in which a wheel shaft 19 is journaled.

Referring more particularly to FIGS. 5–9, the chute attachment embodying the features of the present invention is indicated generally at 30 and may be attached to the container body front end 25 and sides 23, 24. The chute attachment 30 has a front spout 31 with two opposite side walls 32 curving downward and toward each other, thereby merging and forming a curved spout bottom 33. The spout 31 has a forward end 34 and a rearward end 35, said forward end 34 shaped generally like an open, half-cylinder. The chute attachment 30 has two sides 40 beginning at the spout rearward end 35 and extending from each spout side wall 32 rearwardly and divergently outward a predetermined distance. The predetermined distance for each side chute attachment side 40 is approximately equal to one-half the distance between the wheelbarrow container body sides 23, 24.

At the predetermined distance each chute attachment side 40 diverges and extends rearwardly a desired distance in parallel relationship with the opposite side 40. Each attachment side 40 has a top 41, a bottom 42, an interior surface 43, an exterior surface 44, and a rear end 45, said interior surface 43 being defined as the surface facing the opposite side. The top 41 of each attachment side 40 is rolled inwardly forming a longitudinal interior surface channel 46 with an open bottom 47. The attachment side rear end 45 has a plurality of holes 48 formed therein. The holes 48 are adapted to receive hooks 51 attached to bungee cords 50 or the like.

The chute attachment 30 is adapted to fit over the wheelbarrow container body front end 25 and sides 23, 24, wherein the chute attachment side channels 46 are fitted over the container body rim 27, channel open ends 47 first. A bungee cord 50 with two ends and a hook 51 attached to each end is looped over each wheelbarrow handle 14, 15 and the bungee cord hooks 51 placed into engagement with the respective chute attachment side holes 48. Alternatively, a hole 28 could be drilled in each wheelbarrow container body side 23, 24. The bungee cords 50 could then be replaced with a small mechanical fastener, e.g., bolt and wing nut, attached through a chute attachment side hole 48 and the wheelbarrow container body side hole 28.

Figure 11:
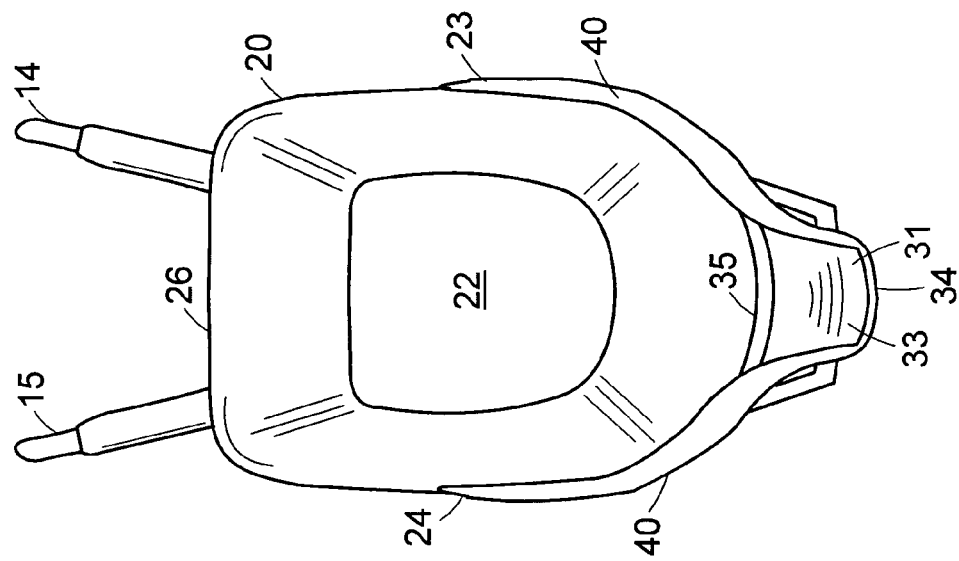
FIG. 11 is a top view of the embodiment illustrated in FIG. 10.
Figure 10:
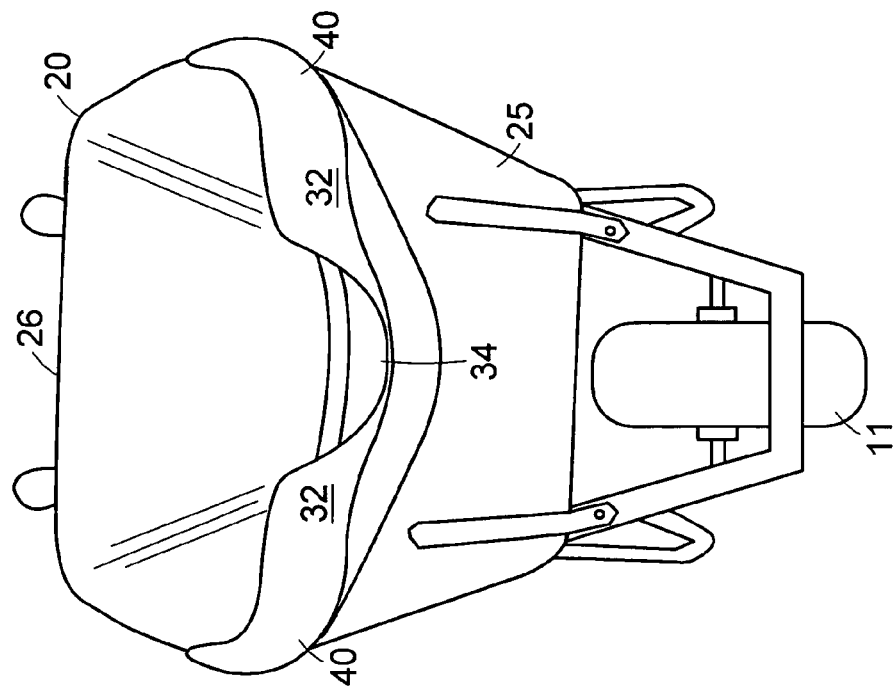
FIG. 10 is a front perspective view of an alternate embodiment of the invention.

Referring more particularly to FIGS. 10–11, in an alternate embodiment of the invention, the wheelbarrow container body front end 25 is be shaped in the form of a spout 31. The container body sides 23, 24 would merge into and form the spout side walls 32.

It is understood that the above-described embodiment is merely illustrative of the application. Other embodiments may be readily devised by those skilled in the art which will embody the principles of the invention and fall within the spirit and scope thereof.

We claim:

1. A chute for a wheelbarrow, comprising:
    a wheelbarrow having a front with a single forward wheel, two side frame pieces running in a rearwardly diverging manner from the front wheel, from which two handles are respectively extended and form a wheelbarrow rear, two rearward support legs each joined to a side frame piece, respectively, in front of the handles, and a container body attached to the two side frame pieces behind the forward wheel and in front of the handles, said container body having an open top, a generally planar bottom attached to said side frame pieces, opposing sides extending upwardly and outwardly inclined from said planar bottom, an upwardly and outwardly inclined front end and opposing rear end, said container body front end, rear end and sides having a continuous rim formed along the top;
    an insert adapted to fit into said container body, said insert having an open top, a generally planar bottom attached, opposing sides extending upwardly and outwardly inclined from said planar bottom, an upwardly and outwardly inclined front end and opposing rear end, said insert front end, rear end and sides having a continuous rim formed along the top, wherein said insert front has a spout formed therein adjacent said insert rim, said spout having two opposite side walls curving downward and toward each other, thereby merging and forming a curved spout bottom, said spout having a forward end protruding past said insert front and a rearward end, said forward end shaped generally as an open, half-cylinder;
    wherein said insert sides merge into said spout side walls.

* * * * *